(12) United States Patent
Army, Jr. et al.

(10) Patent No.: US 10,954,858 B2
(45) Date of Patent: Mar. 23, 2021

(54) PLATE FIN HEAT EXCHANGER

(71) Applicant: Hamilton Sundstrand Corporation, Windsor Locks, CT (US)

(72) Inventors: Donald E. Army, Jr., Enfield, CT (US); Michael Doe, Jr., Southwick, MA (US); Kurt L. Stephens, Enfield, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 531 days.

(21) Appl. No.: 14/743,778

(22) Filed: Jun. 18, 2015

(65) Prior Publication Data
US 2016/0369698 A1 Dec. 22, 2016

(51) Int. Cl.
*F02C 7/00* (2006.01)
*F02C 7/18* (2006.01)
*F28F 3/02* (2006.01)
*F28D 9/00* (2006.01)
*F28D 1/03* (2006.01)
*F28D 21/00* (2006.01)

(52) U.S. Cl.
CPC ............ *F02C 7/185* (2013.01); *F28D 1/0383* (2013.01); *F28D 9/0062* (2013.01); *F28D 9/0068* (2013.01); *F28F 3/025* (2013.01); *F28D 2021/0021* (2013.01)

(58) Field of Classification Search
CPC ..... F02C 7/14; F28F 3/02; F28F 3/025; F28F 9/002; B23P 15/26; F28D 9/0062; F28D 9/0068; F28D 9/0093; F28D 9/02
See application file for complete search history.

(56) References Cited

U.S. PATENT DOCUMENTS 3,262,496 A * 7/1966 Bawabe ................ F28D 9/0068
165/166
3,490,522 A * 1/1970 Bizzarro ................ F28F 3/025
165/166
(Continued)

FOREIGN PATENT DOCUMENTS

EP 1243886 A1 9/2002
EP 1739378 A1 1/2007
(Continued)

OTHER PUBLICATIONS

Search Report regarding related EP App. No. 16175118.5; dated Oct. 20, 2016; 7 pgs.

Primary Examiner — Todd E Manahan
Assistant Examiner — Edwin Kang
(74) Attorney, Agent, or Firm — Cantor Colburn LLP

(57) ABSTRACT

A plate fin heat exchanger is disclosed. The heat exchanger includes a plurality of plates defining a set of hot fluid passages between adjacent plates of the plurality of plates and a set of cold fluid passages between adjacent plates of the plurality of plates. A hot fluid inlet and outlet are located at a first face of the heat exchanger. A barrier is located between adjacent plates defining the hot fluid passages. The barrier extends between the adjacent plates and extends from the first face of the heat exchanger at a location between the hot fluid inlet and the hot fluid outlet in a direction perpendicular to the first face, and defines a first pass of hot fluid passages on a first side of the barrier and a second pass of hot fluid passages on a second side of the barrier.

17 Claims, 4 Drawing Sheets

(56) References Cited

U.S. PATENT DOCUMENTS

| | | | | |
|---|---|---|---|---|
| 3,731,736 | A | * | 5/1973 | Fernandes ............. F28D 9/0081 |
| | | | | 165/166 |
| 5,114,103 | A | * | 5/1992 | Coffinberry ............. B64C 21/06 |
| | | | | 244/118.5 |
| 5,562,158 | A | * | 10/1996 | Nishishita ............... F28F 3/025 |
| | | | | 165/153 |
| 7,188,488 | B2 | | 3/2007 | Army, Jr. et al. |
| 8,327,924 | B2 | * | 12/2012 | Muley ....................... F28F 3/02 |
| | | | | 165/135 |
| 2003/0111216 | A1 | * | 6/2003 | Hirao .................... B01J 19/002 |
| | | | | 165/166 |
| 2005/0274501 | A1 | | 12/2005 | Agee |
| 2006/0289152 | A1 | | 12/2006 | Leuschner et al. |
| 2013/0133348 | A1 | * | 5/2013 | Squier .................... B64D 13/08 |
| | | | | 62/172 |
| 2013/0299144 | A1 | * | 11/2013 | Van Lieu ................ F28F 3/025 |
| | | | | 165/165 |
| 2014/0260362 | A1 | | 9/2014 | Jung |
| 2015/0041109 | A1 | | 2/2015 | Zager |
| 2015/0053380 | A1 | | 2/2015 | Army, Jr. |
| 2015/0096728 | A1 | * | 4/2015 | Agner ..................... F28F 1/126 |
| | | | | 165/168 |
| 2015/0107261 | A1 | * | 4/2015 | Moes ...................... B64D 13/06 |
| | | | | 60/783 |
| 2015/0252727 | A1 | * | 9/2015 | Aoki ........................ F02C 7/14 |
| | | | | 165/51 |
| 2016/0214723 | A1 | * | 7/2016 | Fox ........................ B64D 13/06 |

FOREIGN PATENT DOCUMENTS

| | | | |
|---|---|---|---|
| EP | 2840345 | A2 | 2/2015 |
| WO | 2015071933 | A1 | 9/2002 |

\* cited by examiner

PLATE FIN HEAT EXCHANGER

BACKGROUND

This disclosure relates to heat exchangers, and in particular to a multi-pass plate fin heat exchanger.

Heat exchangers are often used to transfer heat between two fluids. For example, in aircraft environmental control systems, heat exchangers may be used to transfer heat between a relatively hot air source (e.g., bleed air from a gas turbine engine) and a relatively cool air source (e.g., outside air). Some heat exchangers, often referred to as plate fin heat exchangers, include a plate fin core having multiple heat transfer sheets arranged in layers to define air passages there between. Closure bars seal alternating inlets of hot air and cool air inlet sides of the core. Accordingly, hot air and cool air are directed through alternating passages to form alternating layers of hot and cool air within the core. Heat is transferred between the hot and cool air via the heat transfer sheets that separate the layers. In addition, to facilitate heat transfer between the layers, each of the passages can include heat transfer fins, often formed of corrugated material (e.g., steel), that are oriented in a direction of the flow within the passage. The heat transfer fins increase turbulence and surface area that is exposed to the airflow, thereby enhancing heat transfer between the layers.

Bleed air from a gas turbine engine such as on an aircraft is at a high temperature, often in excess of 1000° F. This bleed air is too hot for an ECS air cycle machine to effectively utilize for producing conditioned cabin air, and is also too hot for easy transport from the aircraft engine to ECS air cycle machines typically located in the aircraft wing stem. Accordingly, the bleed air is usually passed through a heat exchanger in a location proximate to the engine. This heat exchanger, often referred to as a precooler, is typically tasked with cooling the bleed air from a temperature in excess of 1000° F. to a temperature below 400° F. Such temperature differences between inlet and outlet temperatures on the heat rejection side of the heat exchanger can subject the heat exchanger to undesirable levels of thermal stress. Additionally, if the heat rejection side of the heat exchanger has multiple passes, the overall large temperature difference will necessitate large temperature differences between adjacent passes in the heat exchanger, which can contribute to reduced heat transfer efficiency from heat being conductively transferred through the pass barrier from a hotter pass closer to the hot side inlet to an adjacent cooler pass closer to the hot side outlet.

BRIEF DESCRIPTION

In some aspects of this disclosure, a plate fin heat exchanger is disclosed, comprising a plurality of plates defining a set of hot fluid passages between adjacent plates of the plurality of plates and a set of cold fluid passages between adjacent plates of the plurality of plates. A hot fluid inlet and a hot fluid outlet are located at a first face of the heat exchanger. A barrier is located between adjacent plates defining the hot fluid passages. This barrier extends between the adjacent plates and extends from the first face of the heat exchanger at a location between the hot fluid inlet and the hot fluid outlet in a direction perpendicular to the first face. The barrier defines a first pass of hot fluid passages on a first side of the barrier and a second pass of hot fluid passages on a second side of the barrier. The barrier also comprises a void space isolated from the first and second passes of hot fluid passages.

In some aspects of this disclosure, an environmental conditioning system comprises a gas turbine engine, a precooler that receives and cools a bleed flow of compressed air from the gas turbine engine, and an air cycle machine that conditions air received from the precooler. The precooler comprises a plurality of plates defining a set of hot air passages between adjacent plates of the plurality of plates and a set of cold air passages between adjacent plates of the plurality of plates. A hot air inlet is in fluid communication with the bleed flow from engine, and a hot air outlet is in fluid communication with the air cycle machine, with the hot air inlet and hot air outlet located at a first face of the heat exchanger. A barrier is located in the space between adjacent plates defining the hot air passages. This barrier extends between the adjacent plates and extends from the first face of the heat exchanger at a location between the hot air inlet and the hot air outlet in a direction perpendicular to the first face. The barrier defines a first pass of hot air passages on a first side of the barrier and a second pass of hot air passages on a second side of the barrier. The barrier also comprises a void space isolated from the first and second passes of hot air passages.

In some aspects of this disclosure, a method of cooling a fluid, comprises passing the fluid through a heat rejection side of a plate fin heat exchanger comprising a plurality of plates defining a set of hot fluid passages between adjacent plates of the plurality of plates and a set of cold fluid passages between adjacent plates of the plurality of plates. A hot fluid inlet and a hot fluid outlet are located at a first face of the heat exchanger. A barrier is located between adjacent plates defining the hot fluid passages. This barrier extends between the adjacent plates and extends from the first face of the heat exchanger at a location between the hot fluid inlet and the hot fluid outlet in a direction perpendicular to the first face. The barrier defines a first pass of hot fluid passages on a first side of the barrier and a second pass of hot fluid passages on a second side of the barrier. The barrier also comprises a void space isolated from the first and second passes of hot fluid passages.

BRIEF DESCRIPTION OF THE DRAWINGS

The subject matter of the disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
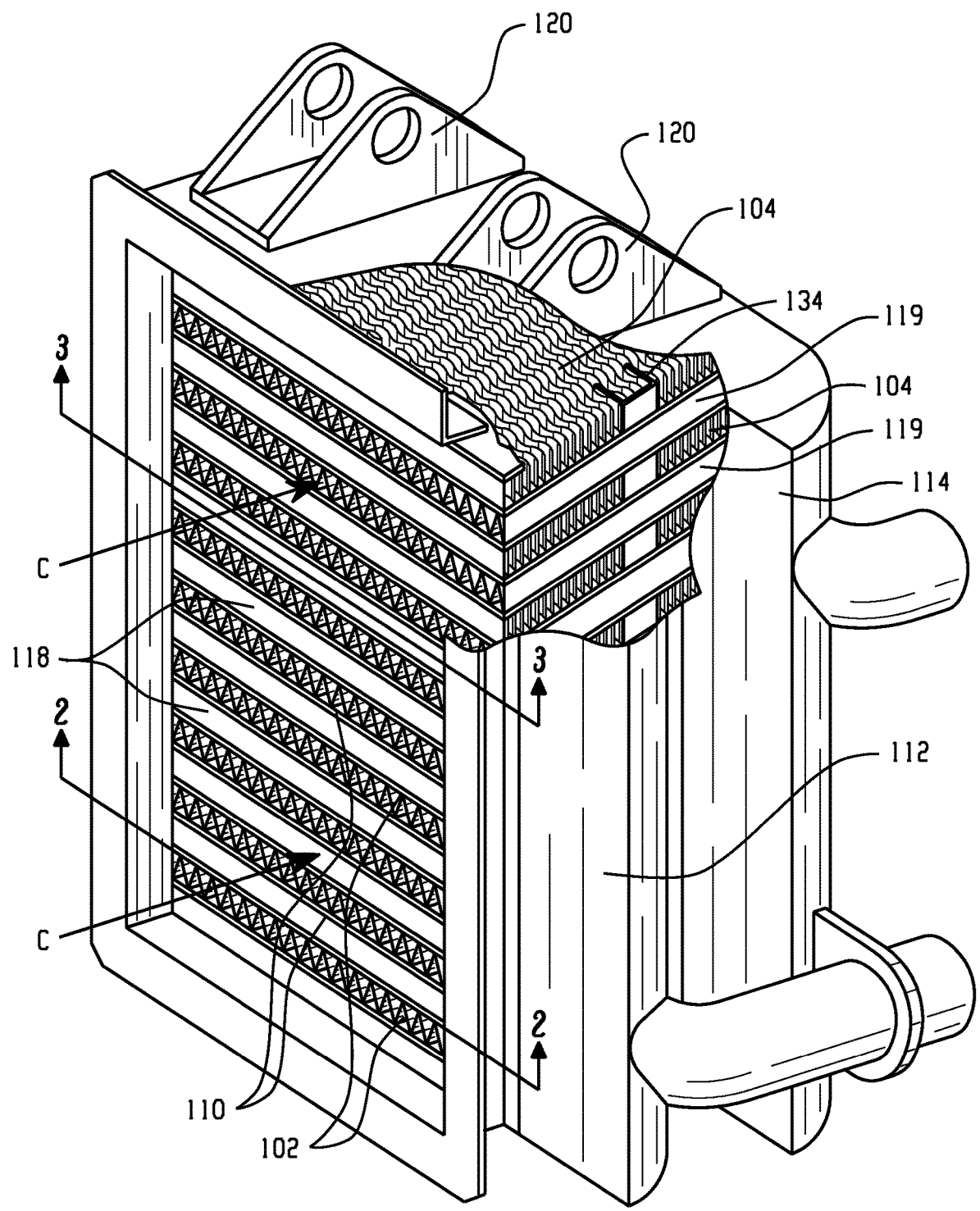
FIG. 1 is a schematic depiction of an exemplary heat exchanger in an isometric view.

Referring now to the Figures, an isometric view of exemplary heat exchanger 100 is shown in FIG. 1. As shown in FIG. 1, heat exchanger 100 includes stacked cold side fin structures 102 and stacked hot side fin structures 104. Cold fin structures 102 are typically configured in an accordion pattern that act to remove heat from adjacent hot fin structures 104 by thermal conduction. Hot fin structures 104 typically comprise stacked layers of metal foil fin elements in a wavy pattern to maximize contact between the wavy fins and hot bleed air passing through the hot fin structures 104. Cold air, such as aircraft ram air enters the stacked cold fin structures 102 in the direction of arrows C and cools the cold fin structures 102. Hot air such as bleed air from an engine bleed system enters stacked hot fin structures 104 flows in the direction of arrows H, entering through hot air inlet header 112 and exiting through hot air outlet header 114, and is cooled from air flow in stacked cold fin structures 102. Hot and cold air flow in heat exchanger 100 is configured for cross-flow.

Stacked cold fin structures 102 contain metal foil heat exchanger elements in an accordion pattern that act to remove heat from adjacent hot fin structures 104 by conduction. Stacked hot fin structures 104 typically contain stacked layers of metal foil fin elements in a wavy pattern to maximize contact between the wavy fins and hot air passing through the hot fin structure. The stacked hot fin structures 104 and cold fin structures 102 are separated by parting sheets 110. Parting sheets 110 can also be formed from metal alloys and act to support the foil elements in the hot and cold fin structures 104 and 102. Closure bars 118 form the outside barriers of hot fin structures 104, and a similar set of closure bars 119 form the outside barriers of cold fin structures 102 when viewed from the face of the heat exchanger having the hot air inlet and outlet headers 112 and 114, respectively. Mounting brackets 120 are disposed located on a face of the heat exchanger 100 corresponding to the internal location of the centrally-located barrier 130 (FIG. 2), which can promote structural integrity and stress management. End caps 34 isolates barrier 130 (FIG. 2) from hot side fluid flow, as described in more detail below. Additional structural elements (not shown) include core bands which act to support the overall stack of hot and cold fin structures of heat exchanger 100.

The metal components of heat exchanger 100 may be any metal known in the art of heat exchanger design. In some embodiments, the metal components are made from a steel alloy.

Figure 2:
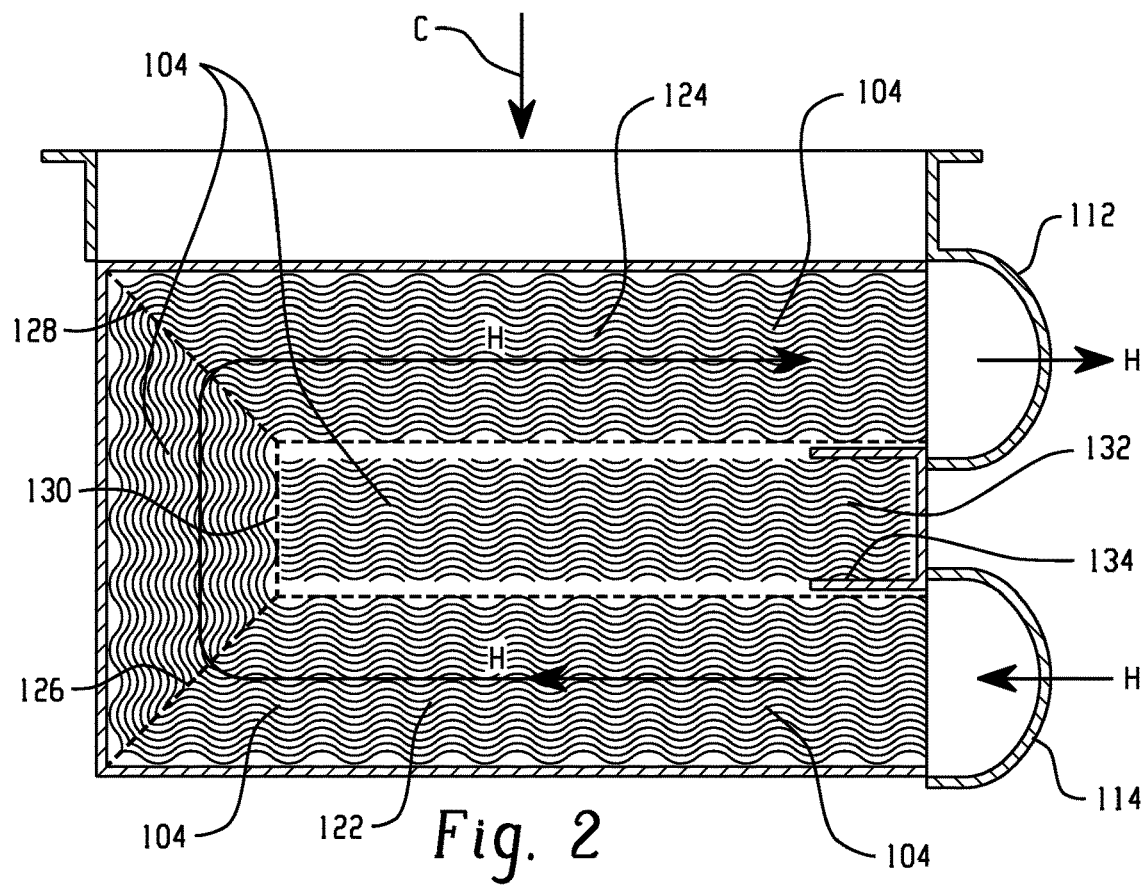
FIG. 2 is a schematic depiction of cross-section of a heat rejection side of an exemplary heat exchanger.

Turning now to FIG. 2, a cross-sectional view of hot fin structures 104 is shown. As shown in FIG. 2, hot fluid enters through hot fluid inlet header 112 and is guided by the hot side fin structures 104 through the heat exchanger hot side first pass 122 and the second pass 124. The flow of hot fluid is redirected at junctions 126 and 128 using a mitered fin to turn the first pass 122 flow 90° counter to the cold inlet and then again turn the flow another 90° into the second pass 124.

As further shown in FIG. 2, a barrier 130 separates the first pass 122 and the second pass 124. The barrier provides a physical separation between the first and second hot fluid passes, and contains a void space isolated from the first and second passes of hot fluid passages. By "void space" is meant a space that is void of structure, e.g., an air space. In some embodiments, the physical separation provided by the barrier 130 between the first pass 122 and the second pass 124 can range from 0.2 to 3.0 inches, and more specifically 0.9 to 2.6 inches. Being isolated, the void space provides a space of non-moving or 'dead' fluid or air, thus providing a thermal barrier between the first and second passes. Such a thermal barrier reduces heat transferred by conduction directly from the first pass to the second pass, thereby promoting the ability for the heat exchanger to accommodate larger temperature differentials between the hot fluid inlet header 112 and the hot fluid outlet header 114, while managing thermal stresses on the heat exchanger structure. The barrier can be configured in a variety of ways. For example, the barrier can be provided by a wall or walls extending vertically between the adjacent parting sheets 110 (FIG. 1) and horizontally from the face of the heat exchanger with hot inlet and outlet headers 112, 114, along the dashed line depicted in FIG. 2. However, a separate wall structure is not necessary, as the barrier can be provided by fin structures 104, e.g., by a fin that is sealed to end cap 134 so that the fin provides a barrier between the hot fluid flow area and the barrier 130 isolated from fluid flow. It should be noted here that the dashed line representing the border of barrier 130 in FIG. 2 is of course conceptual, and the interruption of the fin structure adjacent to the dashed line is for ease of illustration with regard to the dashed line. Embodiments are also included where the fin pattern is not interrupted, such as illustrated in FIG. 1, although fin spacing and thickness can be different inside the barrier 130 compared to the fin spacing and thickness in the fluid flow area outside the barrier 130, as the structural or thermal characteristics of the barrier 130 can be different than that of the fluid flow area. The fin structures can be sealed where they intersect with the parting sheets 110 (FIG. 1). A void space isolated from the hot fluid flow in first and second passes 122, 124 can be provided by sealing the ends of the fin structures 132 with an end cap 134 to isolate the spaces between the fin structures 132 from the hot fluid flow at the headers. The void space can be left unsealed at the end of the barrier 130 opposite the headers 112, 114, as hot fluid will tend not flow into the void space since it has no place to exit. Alternatively, the void space can be sealed at the end of the barrier 130 opposite the headers 112, 114 to provide a fully sealed void space in the gaps between the fin structures 132.

Figure 5:
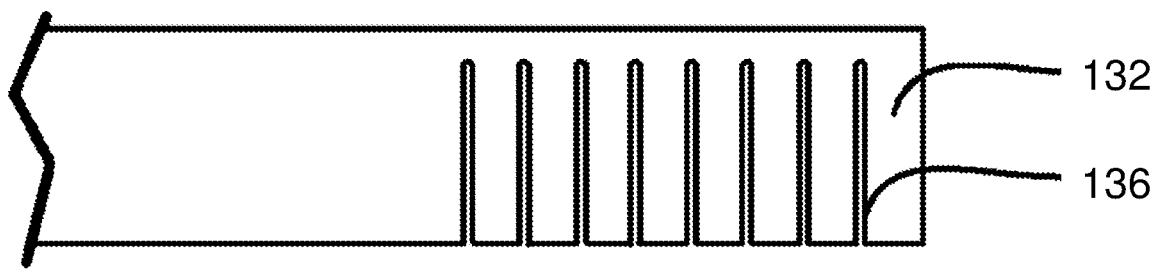
FIG. 5 is a schematic depiction of a slotted heat exchanger fin.

Any of the fin structures can be equipped with slots such as those described in US published patent application US 2015/0053380 A1 of Army, Jr. et al., the disclosure of which is incorporated herein by reference in its entirety. As described in this publication, the slots can provide a technical effect of arresting crack propagation. Additionally, with respect to the fin structures 104, the slots can provide additional compliance for thermal stress management. An example embodiment of slots 136 in a barrier fin structure 132 is schematically shown in FIG. 5. Fin dimensions and spacing can vary depending on system requirements and specifications. Fin height of course depends on the distance separating adjacent parting sheets, and can range from 0.04 to 0.5 inches. Fin thickness can range from 0.002 to 0.012, and fin spacing can range from 10 fpi (fins per inch) to 35 fpi. In some embodiments, the fin dimensions (e.g., thickness, spacing) for the barrier fin structures 132 can be different than for the fin structures 102 to provide desired compliance and other physical characteristics to the barrier 130.

Figure 3:
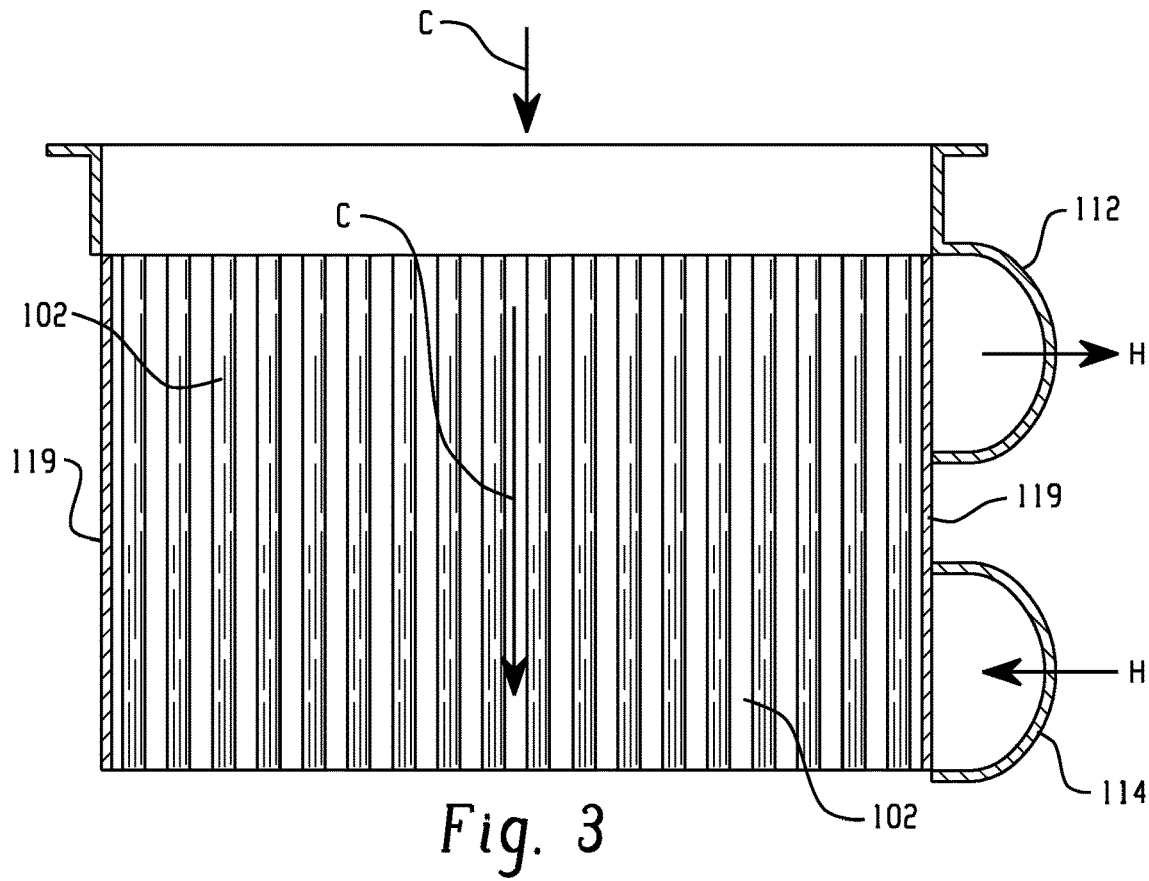
FIG. 3 is a schematic depiction of cross-section of a heat absorption side of an exemplary heat exchanger.

The cold side of the heat exchanger 100 is depicted in FIG. 3, where cold air such as aircraft ram air flows across the cold fin structures 102 in the direction of arrows C to cool the cold fin structures 102. Headers 112 and 114 for the hot side of heat exchanger 100 are also depicted in FIG. 3.

The heat exchanger embodiments described herein can be used in operating conditions where high temperatures, large temperature differences, or both, are encountered. In some aspects, the heat exchanger is operated under conditions where there is a temperature difference of at least 200° F. between the hot side inlet and hot side outlet. In some aspects, fluid temperatures at the hot side inlet temperatures can range from 400° F. to 1400° F. In some aspects, fluid temperatures at the hot side outlet temperatures can range from 100° F. to 400° F.

Figure 4:
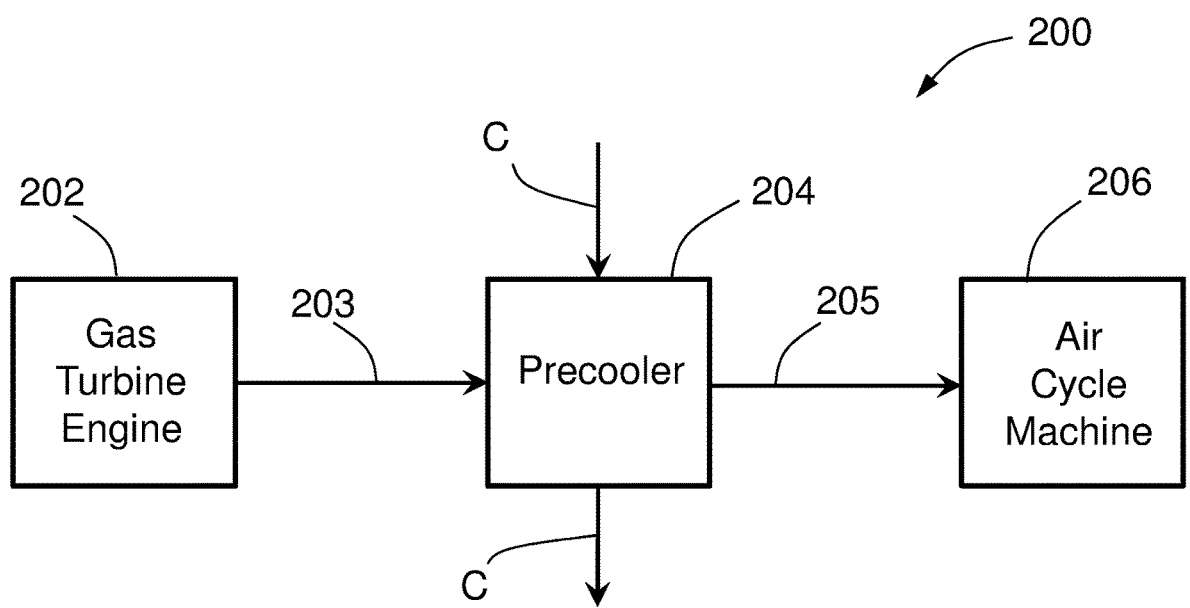
FIG. 4 is a schematic depiction of an exemplary environmental control system utilizing a heat exchanger as described herein.

In some aspects, the heat exchanger 100 can be used as a precooler or other heat exchanger in an environmental conditioning system (ECS) with a gas turbine engine. Such a system is schematically depicted in FIG. 4. As shown in FIG. 4, ECS system 200 comprises a gas turbine engine 202, from which bleed air 203 is directed to a precooler 204 (i.e., heat exchanger 100), and then the cooled bleed air 205 is directed to an air cycle machine 206. The air cycle machine 206 can be any of a number of known variations of such air cycle machines. An exemplary air cycle machine is described in U.S. Pat. No. 7,188,488 to Army, Jr. et al., the disclosure of which is incorporated herein by reference in its entirety. Further details regarding the ECS are known in the art, and do not require additional detailed description herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A plate fin heat exchanger, comprising:
a plurality of plates defining a set of hot fluid passages between a first set of adjacent plates of the plurality of plates and a set of cold fluid passages between a second set of adjacent plates of the plurality of plates;
a hot fluid inlet and a hot fluid outlet located at a first face of the plate fin heat exchanger; and
a fluid flow barrier between the first set of adjacent plates defining the set of hot fluid passages, said fluid flow barrier defining a first pass of the set of hot fluid passages on a first side of the fluid flow barrier and a second pass of the set of hot fluid passages on a second side of the fluid flow barrier, said fluid flow barrier comprising a set of barrier fins between the first set of adjacent plates and extending from the first face of the plate fin heat exchanger at a location between the hot fluid inlet and the hot fluid outlet in a direction perpendicular to the first face, wherein said set of barrier fins includes a first fin including a first fin outer surface in fluid communication with the first pass of the set of hot fluid passages, a second fin including a second fin outer surface in fluid communication with the second pass of the set of hot fluid passages, and a void space in fluid communication with an inner surface of the first fin and an inner surface of the second fin and isolated from the first and second passes of the set of hot fluid passages, wherein the fluid flow barrier further includes an end cap at the first face and extending along the first fin outer surface and the second fin outer surface, wherein the end cap is U-shaped and includes a central leg at the first face of the plate fine heat exchanger, a first side leg extending from the central leg along the first fin outer surface, and a second side leg extending from the central leg along the second fin outer surface.

2. The plate fin heat exchanger of claim 1, wherein the fluid flow barrier comprises a sealed enclosure.

3. The plate fin heat exchanger of claim 2, wherein the fluid flow barrier is sealed at the first set of adjacent plates and at the first face of the plate fin heat exchanger between the hot fluid inlet and the hot fluid outlet.

4. The plate fin heat exchanger of claim 3, wherein the fluid flow barrier is sealed at an opposite end of the fluid flow barrier from the first face.

5. The plate fin heat exchanger of claim 1, wherein the set of barrier fins comprises machined slots therein.

6. The plate fin heat exchanger of claim 1, wherein the fluid flow barrier provides a distance between the first pass of the set of hot air passages and the second pass of the set of hot air passages of 0.2 to 3.0 inches.

7. The plate fin heat exchanger of claim 1, wherein the set of hot fluid passages include hot fluid passage fins, wherein the hot fluid passage fins direct fluid: from the hot fluid inlet along the first pass of the set of hot fluid passages, from the first pass of the set of hot fluid passages around the set of barrier fins to the second pass of the set of hot fluid passages, and along the second pass of the set of hot fluid passages to the hot fluid outlet.

8. The plate fin heat exchanger of claim 7, wherein the hot fluid passage fins include mitered fins that direct the fluid from the first pass of the set of hot fluid passages around the set of barrier fins to the second pass of hot fluid passages.

9. An environmental conditioning system comprising a gas turbine engine, a precooler that receives and cools a bleed flow of compressed air from the gas turbine engine, and an air cycle machine that conditions air received from the precooler, wherein the precooler comprises
a plurality of plates defining a set of hot air passages between a first set of adjacent plates of the plurality of plates and a set of cold air passages between a second set of adjacent plates of the plurality of plates;
a hot air inlet in fluid communication with the bleed flow from the gas turbine engine, and a hot air outlet in fluid communication with the air cycle machine, the hot air inlet and the hot air outlet located at a first face of the precooler; and
a barrier in a space between the first set of adjacent plates defining the set of hot air passages, said barrier defining a first pass of the set of hot air passages on a first side of the barrier and a second pass of the set of hot air passages on a second side of the barrier, said barrier comprising a set of barrier fins between the first set of adjacent plates and extending from the first face of the precooler at a location between the hot air inlet and the hot air outlet in a direction perpendicular to the first face, wherein said set of barrier fins includes a first fin including a first fin outer surface in fluid communication with the first pass of the set of hot air passages, a second fin including a second fin outer surface in fluid communication with the second pass of the set of hot air passages, and a void space in fluid communication with an inner surface of the first fin and an inner surface of the second fin and isolated from the first and second passes of the set of hot air passages, wherein the barrier further includes an end cap at the first face and extending along the first fin outer surface and the second fin outer surface, wherein the end cap is U-shaped and includes a central leg at the first face of the plate fin heat exchanger, a first side leg extending from the central leg along the first fin outer surface, and a second side leg extending from the central leg along the second fin outer surface.

10. The environmental conditioning system of claim 9, wherein the barrier comprises a sealed enclosure.

11. The environmental conditioning system of claim 10, wherein the barrier is sealed at the first set of adjacent plates and at the first face of the precooler between the hot air inlet and the hot air outlet.

12. The environmental conditioning system of claim 11, wherein the barrier is sealed at an opposite end of the barrier from the first face.

13. The environmental conditioning system of claim 9, wherein the set of barrier fins comprises machined slots therein.

14. The environmental conditioning system of claim 9, wherein the barrier provides a distance between the first pass of the set of hot air passages and the second pass of the set of hot air passages of 0.2 to 3.0 inches.

15. A method of cooling a fluid, comprising
providing a plate fin heat exchanger comprising:
a plurality of plates defining a set of hot fluid passages between a first set of adjacent plates of the plurality of plates and a set of cold fluid passages between a second set of adjacent plates of the plurality of plates;
a hot fluid inlet and a hot fluid outlet located at a first face of the plate fin heat exchanger; and
a fluid flow barrier between the first set of adjacent plates defining the set of hot fluid passages, said fluid flow barrier defining a first pass of the set of hot fluid passages on a first side of the fluid flow barrier and a second pass of the set of hot fluid passages on a second side of the fluid flow barrier, said fluid flow barrier comprising a set of barrier fins between the first set of adjacent plates and extending from the first face of the plate fin heat exchanger at a location between the hot fluid inlet and the hot fluid outlet in a direction perpendicular to the first face, wherein said set of barrier fins includes a first fin including a first fin outer surface in fluid communication with the first pass of the set of hot fluid passages, a second fin including a second fin outer surface in fluid communication with the second pass of the set of hot fluid passages, and a void space in fluid communication with an inner surface of the first fin and an inner surface of the second fin and isolated from the first and second passes of the set of hot fluid passages, wherein the fluid flow barrier further includes an end cap at the first face and extending along the first fin outer surface and the second fin outer surface, wherein the end cap is U-shaped and includes a central leg at the first face of the plate fin heat exchanger, a first side leg extending from the central leg along the first fin outer surface, and a second side leg extending from the central leg along the second fin outer surface,
introducing the fluid to the hot fluid inlet of the plate fin heat exchanger, and
passing the fluid through the set of hot fluid passages and transferring heat from the fluid in the set of hot fluid passages to the set of cold fluid passages, and removing the fluid through the hot fluid outlet.

16. The method of claim 15, wherein a temperature at the hot fluid inlet is from 400° F. to 1400° F.

17. The method of claim 15, wherein a temperature at the hot fluid outlet is from 100° F. to 400° F.

* * * * *